United States Patent
Inoue et al.

[11] 3,804,597
[45] Apr. 16, 1974

[54] EXHAUST EMISSION CONTROL DEVICE FOR AN INTERNAL COMBUSTION ENGINE

[75] Inventors: Tokuta Inoue; Kiyoshi Nakanishi; Kenji Kato, all of Susono, Japan

[73] Assignee: Toyota Jidosha Kogyo Kabushiki Kaisha, Toyota City, Japan

[22] Filed: Dec. 21, 1971

[21] Appl. No.: 210,338

[30] Foreign Application Priority Data
Sept. 20, 1971  Japan.............................. 46-73135

[52] U.S. Cl................... 23/288 F, 23/213, 23/214, 60/286, 60/301, 60/302, 60/303, 60/299
[51] Int. Cl............................. B01j 9/04, F01n 3/14
[58] Field of Search............ 23/288 F, 288 R, 288 J, 23/213, 214; 60/286, 301, 302, 299, 303

[56] References Cited
UNITED STATES PATENTS

| | | | |
|---|---|---|---|
| 3,581,490 | 6/1971 | Morris | 23/288 F |
| 3,360,927 | 1/1968 | Cornelius | 60/286 X |
| 2,190,548 | 2/1940 | Bouverie et al. | 23/288 J |
| 3,201,338 | 8/1965 | Pennington | 23/288 F UX |
| 3,597,165 | 8/1971 | Keith et al. | 23/288 F |

*Primary Examiner*—James H. Tayman, Jr.
*Attorney, Agent, or Firm*—Stevens, Davis, Miller & Mosher

[57] ABSTRACT

Exhaust emission control device for an internal combustion engine comprising a chamber for removing oxides of nitrogen having mounted therein at least one catalyst element for removing oxides of nitrogen, at least one exhaust gas intake manifold connecting said chamber for removing oxides of nitrogen with an exhaust gas outlet port of the internal combustion engine, and a recombustion chamber of an afterburner formed in said chamber for removing oxides of nitrogen and provided with an exhaust gas outlet line. Said device further comprises an exhaust gas inlet port formed in a shell of said recombustion chamber for maintaining communication between said chamber for removing oxides of nitrogen and said recombustion chamber, and a vortical flame producing chamber of the afterburner connected to a side of said recombustion chamber at which said exhaust gas inlet port is formed.

6 Claims, 7 Drawing Figures

EXHAUST EMISSION CONTROL DEVICE FOR AN INTERNAL COMBUSTION ENGINE

This invention relates to an exhaust emission control device for an internal combustion engine which is effective to remove oxides of nitrogen and unburned noxious components of exhaust gases of the internal combustion engine.

Attempts have hitherto been made to develop an exhaust emission control device for an internal combustion engine which is capable of removing not only one of noxious components of exhaust gases but also a plurality of such components by combining a plurality of exhaust emission control devices for different components into a single device.

Conventional exhaust emission control devices each designed to remove one noxious component from exhaust gases have a disadvantage in that they require a long interval of time to warm up after engine start. Thus, a combination device comprising a plurality of such conventional devices also requires a long interval of time to warm up after engine start, so that such device tends to be very low in exhaust emission control efficiency.

The exhaust emission control efficiency of such combination device is further reduced by the fact that individual devices intended to remove different noxious components tend to be incompatible with one another. Besides, such combination device is naturally large in size and heavy in weight.

Accordingly, a principal object of this invention is to provide an exhaust emission control device adapted to be quickly warmed up following engine start which exhibits high exhaust emission control efficiency at initial stages of engine start and continues to exhibit high efficiency in removing noxious components from exhaust gases during operation.

Another object of the invention is to provide an exhaust emission control device of a compact type which is capable of removing unburned noxious components comprising carbon monoxide and hydrocarbons and oxides of nitrogen from exhaust gases.

According to this invention, there is provided an exhaust emission control device which obviates the disadvantages of exhaust emission control devices of the prior art designed to remove plurality of noxious components from exhaust gases.

Additional and further objects and advantages are those inherent in the invention hereinafter shown, described and claimed, and will become evident as the description proceeds.

Figure 1:
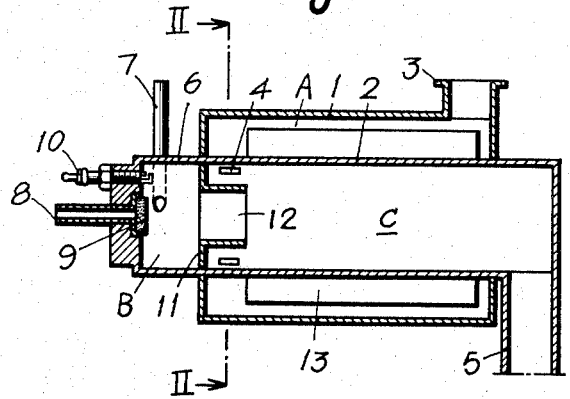
FIG. 1 is a vertical sectional side view of a first embodiment of this invention.
Figure 2:
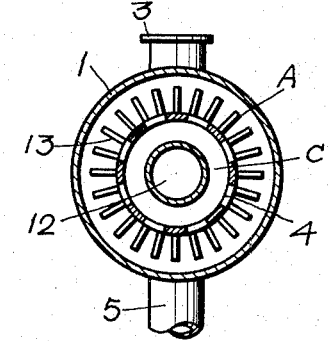
FIG. 2 is a sectional view taken along the line II—II of FIG. 1.

In FIG. 1 and FIG. 2, a cylindrical casing 1 of the exhaust emission control device according to this invention is shown as having mounted therein a casing 2 of the afterburner body which is of smaller diameter than casing 1 and concentrically mounted in the casing 1.

The two casings 1 and 2 define therebetween a hollow chamber of the cylindrical shape which serves as a chamber for removing oxides of nitrogen from exhaust gases A in which are disposed a number of catalyst elements for removing oxides of nitrogen 13 of the rectangular plate shape made as of precious metal. Catalyst elements 13 are mounted radially on an outer wall surface of case 2 in suitably spaced-apart relationship with their longitudinal sides being parallel to a center axis of case 2. Chamber A is maintained in communication with an exhaust gas outlet port of the internal combustion engine through an exhaust gas intake manifold 3.

A chamber defined by an inner wall surface of the afterburner casing 2 serves as an exhaust gas recombustion chamber C which is maintained in communication with chamber A through exhaust gas inlet ports 4, so that exhaust gases containing therein unburned noxious components from which oxides of nitrogen have been removed in chamber A are introduced into recombustion chamber C through inlet ports 4.

An exhaust gas outlet line 5 is connected to an end portion of recombustion chamber C opposite to the end portion thereof at which exhaust gas inlet ports 4 are formed. Purified exhaust gases from which unburned noxious components have been removed are vented to atmosphere through line 5.

Attached to the side of the afterburner case 2 in which exhaust gas inlet ports 4 are formed is a vortex burner which comprises a burner body 6 of a cylindrical shape secured to case 1 and defining therein a vortical flame producing chamber B.

A combustion air inlet line 7 opening tangentially in burner body 6 is connected to vortical flame producing chamber B. A carburettor 9 shaped like an evaporating dish and connected to a fuel inlet line 8 and a spark plug 10 are provided in vortical flame producing chamber B. A mixture of gasified fuel and combustion air is ignited by means of spark plug 10 in vortical flame producing chamber B and the flames produced therein are moved in vortical form by air currents introduced tangentially from combustion air inlet line 7 into burner body 6.

Vortical flame producing chamber B and recombustion chamber C which are maintained in communication with each other through a flame inlet port 12 formed in a partition wall 11 constitute a principal portion of the afterburner. The flames in vortical form produced in vortical flame producing chamber B pass through flame inlet port 12 and ejected into recombustion chamber C in which the flames move in vortical form toward the exhaust gas outlet line 5 in recombustion chamber C.

The exhaust emission control device constructed as aforementioned operates as follows:

Exhaust gases from an internal combustion engine to be treated are introduced through exhaust gas intake manifold 3 into the chamber A for removing oxides of nitrogen where they are brought into contact with catalyst elements for removing oxides of nitrogen 13 which are metallic plates on which platinum is deposited by vaporization in vacuum. By this means, oxides of nitrogen are removed from the exhaust gases as the latter move through chamber A.

The exhaust gases from which oxides of nitrogen have been removed are then led into recombustion chamber C through exhaust gas inlet ports 4.

In the meantime, a mixture of combustion air introduced through combustion air inlet line 7 into chamber B and a fuel supplied through fuel inlet line 8 into chamber B and mixed with air by carburettor 9 is ignited by means of spark plug 10 to produce, in the vortical flame producing chamber B of afterburner, flames which are caused to move in vortical form by air currents introduced in vortical form through air inlet line 7, so that vortical flames are produced in chamber B.

The vortical flames pass into the recombustion chamber C of afterburner while moving in vortical form and ignite the exhaust gases introduced into recombustion chamber C. As a result, unburned noxious components of the exhaust gases in recombustion chamber C, such for example as carbon monoxide, hydrocarbons and the like, are ignited and burned by powerful and stable flames, so that the exhaust gases are rendered harmless and vented to atmosphere through exhaust gas outlet line 5. The chamber for removing oxides of nitrogen A which first receives exhaust gases from the internal combustion engine is disposed on the outer wall surface of the recombustion chamber B of afterburner in enclosing relationship. Because of this arrangement, the catalyst elements for removing oxides of nitrogen 13 mounted in chamber A receives a supply of thermal energy from both the internal combustion engine and the recombustion chamber C of afterburner, so that chamber A is quickly warmed up and made ready for performing purification of exhaust gases. After it has initially been warmed up in this way, chamber A continuously receives a supply of thermal energy from recombustion chamber C so as to be maintained in highly active condition at all times during operation.

On the other hand, the afterburner is quickly warmed up by the flames and the preheating effect of exhaust gases. Besides, exhaust gases are preheated while passing through chamber A by virtue of the function of recombustion chamber C as a heat exchanger. Thus, the exhaust gases introduced into recombustion chamber C are instantly ignited by vortical flames and burn.

Figure 3:
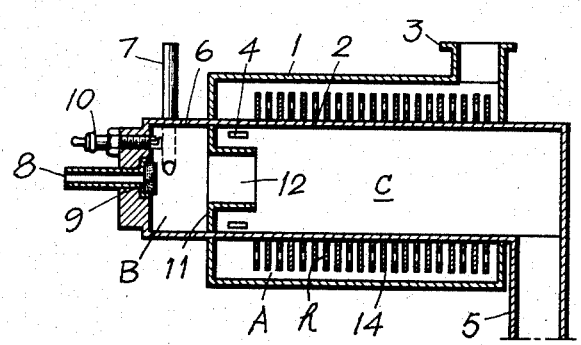
FIG. 3 is a vertical sectional side view of a second embodiment.
Figure 4:
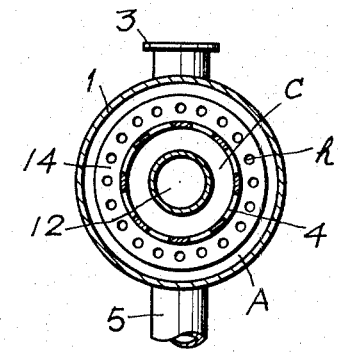
FIG. 4 is a sectional view taken along the line IV—IV of FIG. 3.

FIG. 3 and FIG. 4 show another embodiment of this invention in which a number of catalyst elements for removing oxides of nitrogen 14 in disk shape are disposed in the chamber for removing oxides of nitrogen A. Catalyst elements 14 are formed therein with a multitude of small apertures $h$ and radially mounted on an outer wall surface of case 2 in suitably spaced-apart relationship with their opposite surfaces being disposed at right angles to the center axis of case 2.

Figure 5:
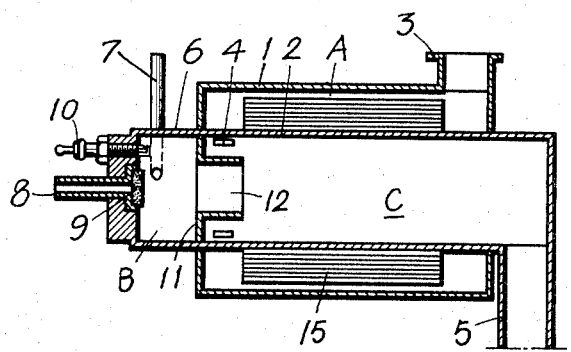
FIG. 5 is a vertical sectional view of a third embodiment.
Figure 6:
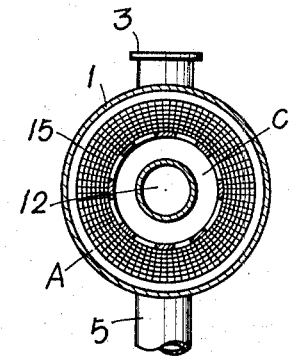
FIG. 6 is a sectional view taken along the line VI—VI of FIG. 5.

An exhaust emission control device shown in FIG. 5 and FIG. 6 is similar to the exhaust emission control device shown in FIG. 1 and FIG. 2 except that an element for removing oxides of nitrogen 15 of the honeycomb shape structure is mounted in the chamber for removing oxides of nitrogen A in the former.

Figure 7:
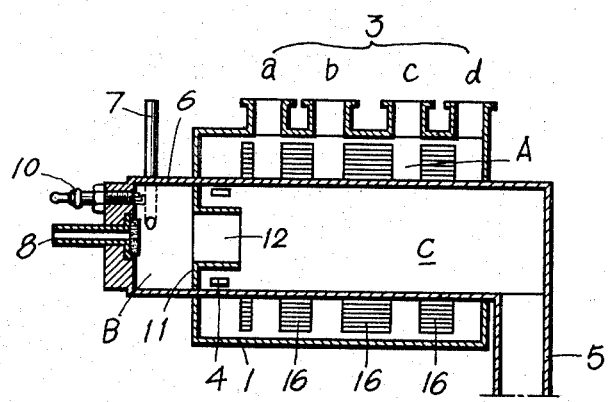
FIG. 7 is a vertical sectional side view of a fourth embodiment.

FIG. 7 is a fourth embodiment of this invention in which a plurality of exhaust gas intake manifolds 3 equal in number to the cylinders of the internal combustion engine (four in the embodiment shown or $a$, $b$, $c$ and $d$) are provided, and a plurality of catalyst elements for removing oxides of nitrogen 16 of the honeycomb structure are mounted on the outer wall surface of case 2 to be disposed in the chamber for removing oxides of nitrogen A. This arrangement is effective to bring exhaust gases introduced into chamber A through all the manifolds into contact with catalyst elements 16 for removing oxides of nitrogen therefrom.

This invention is constructed and operates as aforementioned. It offers the following advantage: According to this invention, the chamber for removing oxides of nitrogen which is mounted over the recombustion chamber of the afterburner in enclosing relationship mounts therein a catalyst element or elements for removing oxides of nitrogen from exhaust gases, and the exhaust gases from the internal combustion engine are first introduced into the chamber for removing oxides of nitrogen. This arrangement permits the catalyst element or elements to receive a supply of thermal energy from both the internal combustion engine and the recombustion chamber, so that the catalyst element or elements are quickly warmed up. On the other hand, the afterburner is warmed up quickly by the preheating effect of exhaust gases and the flames produced in the afterburner itself, so that the exhaust emission control device according to this invention can perform an exhaust gas purifying function at high efficiency as soon as the engine is started.

After the engine is started, a supply of thermal energy is delivered from the recombustion chamber of the afterburner to the catalyst element or elements, so that the catalyst element or elements can be maintained at elevated temperatures as required. Combined with the fact that recombustion chamber acts as a heat exchanger so that the exhaust gases in the chamber for removing oxides of nitrogen are preheated, the fact that the afterburner is a vortex burner so that strong and stable flames in vortical form are emitted into the recombustion chamber makes it possible to subject the exhaust gases to perfect combustion in the recombustion chamber as soon as they are introduced therein. Thus, oxides of nitrogen and unburned noxious components of exhaust gases comprising carbon monoxide, hydrocarbons and the like are both removed at high efficiency.

The construction wherein the afterburner is disposed inwardly of the chamber for removing oxides of nitrogen permits to obtain an overall compact size and a small weight in an exhaust emission control device which is capable of removing both oxides of nitrogen and unburned noxious components from exhaust gases.

What is claimed is:

1. An exhaust emission control device for an internal combustion engine comprising a first chamber, at least one catalyst element for removing oxides of nitrogen mounted therein, at least one exhaust gas intake manifold connecting said chamber with an exhaust gas outlet port of an internal combustion engine, wall means defining a recombustion chamber of an afterburner located within said first chamber and provided with an exhaust gas outlet line, an exhaust gas inlet port formed in said wall means of said recombustion chamber remote from said exhaust gas intake manifold for maintaining communication between said first chamber and said recombustion chamber, said wall means being otherwise impervions, and a vortical flame producing chamber of the afterburner connected to a side of said recombustion chamber at which said exhaust gas inlet port is formed.

2. A device as defined in claim 1 wherein the catalyst elements for removing oxides of nitrogen are mounted radially in suitably spaced-apart relationship.

3. A device as defined in claim 1 wherein the catalyst elements for removing oxides of nitrogen are of rectangular plate shape and made of precious metal, said catalyst elements being mounted radially in suitable spaced-apart relationship with their longitudinal side being parallel to the center axis of said recombustion chamber.

4. A device as defined in claim 1 wherein the catalyst elements for removing nitrogen are of disk shape and formed with a number of small apertures, said catalyst elements being radially mounted in suitable spaced-apart relationship with their radius being at right angles to the center axis of said recombustion chamber.

5. A device as defined in claim 1 wherein the catalyst elements for removing oxides of nitrogen is of honeycomb structure, said catalyst element substantially filling said first chamber.

6. A device as defined in claim 1 wherein a plurality of catalyst elements for removing oxides of nitrogen of honeycomb structure are provided, said catalyst elements being equal in number to the exhaust gas intake manifolds and disposed in said first chamber so as to remove oxides of nitrogen from exhaust gases of the internal combustion engine at high efficiency.

* * * * *